(12) United States Patent
Lee

(10) Patent No.: US 8,971,809 B2
(45) Date of Patent: Mar. 3, 2015

(54) DUMMY TOUCH SCREEN SYSTEM FOR CONNECTING A PLURALITY OF MOBILE TERMINALS

(71) Applicant: Soon Chang Lee, Gyeonggi-Do (KR)

(72) Inventor: Soon Chang Lee, Gyeonggi-Do (KR)

( * ) Notice: Subject to any disclaimer, the term of this patent is extended or adjusted under 35 U.S.C. 154(b) by 263 days.

(21) Appl. No.: 13/691,889

(22) Filed: Dec. 3, 2012

(65) Prior Publication Data

US 2013/0143496 A1  Jun. 6, 2013

(30) Foreign Application Priority Data

Dec. 6, 2011  (KR) .......................... 10-2011-0129703

(51) Int. Cl.
*H04W 16/20* (2009.01)
*G06F 3/14* (2006.01)
*H04W 4/00* (2009.01)

(52) U.S. Cl.
CPC ..................................... *H04W 4/008* (2013.01)
USPC ............. 455/41.2; 345/1.2; 345/1.3; 345/2.1; 345/2.2; 345/2.3

(58) Field of Classification Search
CPC ......... G06F 3/038; G06F 3/041; G06F 13/14; H04W 92/16; H04W 4/00; H04W 16/20
USPC .................................... 455/41.2; 345/1.1–2.3
See application file for complete search history.

(56) References Cited

U.S. PATENT DOCUMENTS 8,718,556 B2* 5/2014 Lee et al. ...................... 455/41.2
2011/0225553 A1* 9/2011 Abramson et al. ............ 715/863
2013/0027289 A1* 1/2013 Choi et al. ..................... 345/156

FOREIGN PATENT DOCUMENTS

KR   1020100070092   6/2010

* cited by examiner

*Primary Examiner* — Lewis West
*Assistant Examiner* — Dong-Chang Shiue
(74) *Attorney, Agent, or Firm* — Nixon Peabody LLP; David S. Resnick

(57) ABSTRACT

Disclosed is a dummy touch screen system. The dummy touch screen system includes a host mobile terminal and a dummy touch screen. Here, the host mobile terminal includes a first touch screen unit having a first touch panel and a first display, a first application module driven by receiving a first touch signal generated by a touch of the first touch panel, a first display module receiving a first image signal output by a drive of the first application module, a first image communication module receiving a second image signal output by the drive of the first application module, and a first human interface device (HID) module transmitting a touch signal transmitted from the outside to the first application module. The dummy touch screen includes a second image communication module receiving the second image signal, a second display module receiving the second image signal from the second image communication module, a second touch screen unit having a second display displaying a second image display signal output by a drive of the second display module, and a second HID module receiving a second touch signal generated by a touch of the second touch panel.

8 Claims, 7 Drawing Sheets

DUMMY TOUCH SCREEN SYSTEM FOR CONNECTING A PLURALITY OF MOBILE TERMINALS

CROSS-REFERENCE TO RELATED APPLICATION

This application is based upon and claims the benefit of priority from Korean Patent Application No. 2011-0129703, filed on Dec. 6, 2011, the entire contents of which are incorporated herein by reference.

BACKGROUND

1. Technical Field

Example embodiments of the present invention relate in general to a dummy touch screen system (a touch screen without ability to autonomously drive an application program) that connects a plurality of mobile terminals, and more specifically, to a dummy touch screen system that connects a plurality of mobile terminals capable of performing bidirectional communication of a dummy touch screen, image data (image information), and touch data which cannot autonomously drive a program between smart phones.

2. Related Art

In the related art, technologies in which a variety of data such as video or voice data displayed on a screen of a laptop or a video player, is displayed on video equipment such as a television (TV) by connecting the video equipment such as a TV including a high definition multimedia interface (HDMI) terminal to the laptop or the video player including a digital visual interface (DVI) terminal, have been disclosed. These technologies may be referred to as mirroring technologies. HDMI is obtained in such a manner that a DVI that is an interface standard specification of a personal computer (PC) and a display is changed to an interface for audio-visual (AV) electronics. Such an HDMI terminal transmits video or voice from a laptop or a video player to video equipment such as a TV without compressing the video or the voice, and therefore a decoder chip or software is not required. That is, compatibility between connected devices may be achieved.

In addition, cumbersome wiring of AV equipment due to video, voice, and control signals which are transmitted via a single cable may be simplified. In addition, the control signals may be transmitted, and therefore a variety of AV equipment may be organically used.

In recent years, smart phones have become popularly disseminated, and therefore as a technology in which a variety of data (video information and voice information) displayed on a screen of the smart phone, is displayed on video equipment such as a TV in the same manner by transmitting the variety of data displayed on the screen of the smart phone to the video equipment such as a TV, a mobile high-definition link (MHL), has been newly developed. Such variety of data may be transmitted and received through an MHL port.

More specifically, an HDMI terminal introduced by Silicon Image that is an advocate of HDMI specification is difficult to be mounted on a smart phone having a thickness less than 1 cm. In order to solve this problem, Silicon Image has announced a port of a new technology specification which is called "MHL", and mirroring to video equipment such as a TV or the like, may be made possible through a smart phone using the MHL of the new specification.

However, in such mirroring technology, a variety of data displayed on a screen of the smart phone is only transmitted to the video equipment such as a TV using the MHL port, and a variety of data displayed on the video equipment such as a TV cannot be transmitted to the smart phone. That is, an existing mirroring technology may not implement bidirectional mirroring.

Meanwhile, for existing bidirectional data transmission, two devices (stand-alone computer) for independently driving a program are required. For example, for the existing bidirectional data transmission, one tablet PC and one smart phone are required. However, in this instance, the tablet PC is expensive, and a user of the smart phone inefficiently has another communication device having similar functionality due to overlapped functions with the smart phone. In addition, a storage database (DB) of a variety of information (for example, an address book, call history, work files, photos, etc.) may be overlapped.

SUMMARY OF THE INVENTION

Accordingly, example embodiments of the present invention are provided to substantially obviate one or more problems due to limitations and disadvantages of the related art.

Example embodiments of the present invention provide a dummy touch screen system that connects a plurality of mobile terminals capable of transmitting a variety of data displayed on a screen of a smart phone to video equipment such as a dummy touch screen or the like, and transmitting a variety of data displayed on the video equipment such as the dummy touch screen or the like, to the smart phone.

In addition, example embodiments of the present invention also provide a dummy touch screen (a touch screen without ability to autonomously drive a program) system that performs input and output of a variety of data (image data or touch data) by implementing bidirectional mirroring.

In some example embodiments, a dummy touch screen system includes: a host mobile terminal including a first touch screen unit that has a first touch panel and a first display, a first application module that is driven by receiving a first touch signal generated by a touch of the first touch panel, a first display module that receives a first image signal output by a drive of the first application module receiving the first touch signal, a first image communication module that receives a second image signal output by the drive of the first application module receiving the first touch signal, and a first human interface device (HID) module that transmits a touch signal transmitted from the outside to the first application module; and a dummy touch screen including a second image communication module that receives the second image signal, a second display module that receives the second image signal from the second image communication module, a second touch screen unit that has a second display that displays a second image display signal output by a drive of the second display module receiving the second image signal and a second touch panel, and a second HID module that receives a second touch signal generated by a touch of the second touch panel. Here, the first display may display a first image display signal output by a drive of the first display module receiving the first image signal, the second HID module may transmit the second touch signal to the first HID module, the first application module may be driven by the second touch signal transmitted from the first HID module, and the first and second image signals output by the drive of the first application module may be respectively distributed to the first display module and the first image communication module.

In addition, the dummy touch screen system may further include at least one additional mobile terminal that has a second radio communication module so as to perform radio transmission and reception with the host mobile terminal. Here, the host mobile terminal may further include a first radio communication module that performs radio communication with the second radio communication module, the at least one additional mobile terminal may include a third touch screen unit that has a third touch panel and a third display, a second application module that is driven by receiving a third touch signal generated by a touch of the third touch panel, a third display module that receives a third image signal output by a drive of the second application module receiving the third touch signal, and the second radio communication module that receives first data output by the drive of the second application module receiving the third touch signal, the third display may display a third image display signal output by a drive of the third display module receiving the third image signal, the second radio communication module may transmit the received first data to the first radio communication module, the first radio communication module may transmit the received first data to the first application module, the first application module may be driven by the first data received from the first radio communication module, the first and second image signals and second data output by the drive of the first application module are respectively distributed to the first display module, the first image communication module, and the first radio communication module, the first radio communication module may transmit the second data distributed to the first radio communication module to the second radio communication module, the second radio communication module may transmit the received second data to the second application module, the third display module may receive the third image signal output by the drive of the second application module receiving the second data, and the third display may display the third image display signal output by the drive of the third display module receiving the third image signal.

In addition, the dummy touch screen system may further include at least one additional mobile terminal that has a fourth radio communication module so as to perform radio transmission and reception with the host mobile terminal. Here, the host mobile terminal may further include a third radio communication module that performs radio communication with the outside, the at least one additional mobile terminal may include a fourth radio communication module that receives a fourth image signal from the outside, a fourth touch screen unit that has a fourth touch panel and a fourth display, a fourth HID module that receives a fourth touch signal generated by a touch of the fourth touch panel and transmits the fourth touch signal to the first HID module, and a fourth display module that receives the fourth image signal from the fourth radio communication module, the first HID module may transmit the received fourth touch signal to the first application module, the first application module may be driven by the fourth touch signal received from the first HID module, the first, the second, the fourth image signals output by the drive of the first application module may be respectively distributed to the first display module, the first image communication module, and the third radio communication module, the third radio communication module may transmit the fourth image signal distributed to the third radio communication module to the fourth radio communication module, and the fourth display may display a fourth image display signal output by a drive of the fourth display module receiving the fourth image signal.

In addition, in the dummy touch screen system according to an embodiment of the present invention, the second touch signal transmitted from the second HID module to the first HID module may be transmitted in a manner of Bluetooth radio transmission and reception.

In addition, in the dummy touch screen system according to the present invention, the fourth touch signal transmitted from the fourth HID module to the first HID module may be transmitted in a manner of Bluetooth radio transmission and reception.

In addition, the dummy touch screen system according to an embodiment of the present invention may further include an image branch module that respectively distributes a first image and a second image output with a time difference by the drive of the first application module receiving the first touch signal. Here, the first display module may receive the first image signal from the image branch module, and the first image communication module may receive the second image signal from the image branch module.

In addition, in the dummy touch screen system according to the present invention, the dummy touch screen may further include at least one image communication module, and at least one additional mobile terminal having the same configuration as that of the host mobile terminal, is connected to the at least one image communication module.

In addition, in the dummy touch screen system according to the present invention, the first image communication module and the second image communication module may be any one of a mobile high-definition link (MHL) module, zigbee, a WiFi module, and a WiHD module.

In addition, in the dummy touch screen system according to the present invention, the first and second image signals output by the drive of the first application module may be distributed to an image signal outputting the same image, or an image signal outputting different images.

BRIEF DESCRIPTION OF DRAWINGS

Example embodiments of the present invention will become more apparent by describing in detail example embodiments of the present invention with reference to the accompanying drawings, in which.

DESCRIPTION OF EXAMPLE EMBODIMENTS

Figure 1:
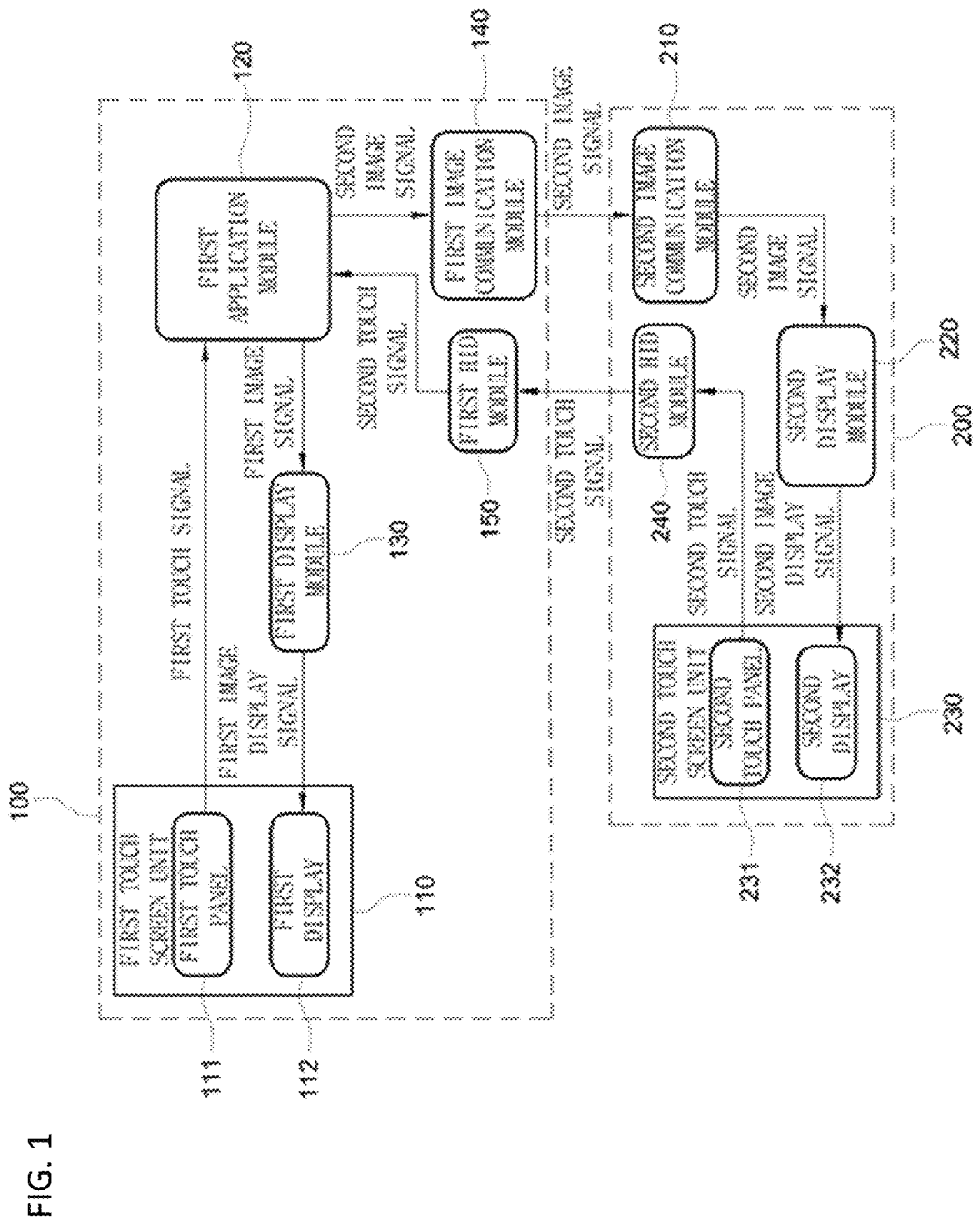
FIG. 1 is a diagram illustrating a configuration between a host mobile terminal and a dummy touch screen in a dummy touch screen system enabling bidirectional mirroring according to an embodiment of the present invention.

Example embodiments of the present invention are described below in sufficient detail to enable those of ordinary skill in the art to embody and practice the present invention. It is important to understand that the present invention may be embodied in many alternate forms and should not be construed as limited to the example embodiments set forth herein.

Accordingly, while the invention can be modified in various ways and take on various forms, specific embodiments thereof are shown in the drawings and described in detail below as examples. There is no intent to limit the invention to the particular forms disclosed. On the contrary, the invention is to cover all modifications, equivalents, and alternatives falling within the spirit and scope of the appended claims. Elements of the example embodiments are consistently denoted by the same reference numerals throughout the drawings and detailed description.

The terminology used herein to describe embodiments of the invention is not intended to limit the scope of the invention. It will be further understood that the terms "comprises," "comprising," "includes," and/or "including," when used herein, specify the presence of stated features, items, steps, operations, elements, and/or components, but do not preclude the presence or addition of one or more other features, items, steps, operations, elements, components, and/or groups thereof.

Hereinafter, preferred embodiments of the present invention will be described in detail with reference to the accompanying drawings. Throughout the accompanying drawings, the same reference numerals are used to designate the same or similar components, and redundant descriptions thereof are omitted for easier overall understanding.

FIG. 1 is a diagram illustrating a configuration between a host mobile terminal and a dummy touch screen in a dummy touch screen system enabling bidirectional mirroring according to an embodiment of the present invention.

Referring to FIG. 1, the dummy touch screen system enabling bidirectional mirroring according to an embodiment of the present invention may include a host mobile terminal 100 and a dummy touch screen 200. Here, the host mobile terminal 100 may include a first touch screen unit 110 that has a first touch panel 111 and a first display 112, a first application module 120 that is driven by receiving a first touch signal generated by a touch of the first touch panel 111, a first display module 130 that receives a first image signal output by a drive of the first application module 120 receiving the first touch signal, a first image communication module 140 that receives a second image signal output by the drive of the first application module 120 receiving the first touch signal, and a first human interface device (HID) module 150 that transmits a touch signal transmitted from the outside to the first application module 120. In addition, the dummy touch screen 200 may include a second image communication module 210 that receives the second image signal, a second display module 220 that receives the second image signal from the second image communication module 210, a second touch screen unit 230 that has a second display 232 that displays a second image display signal output by a drive of the second display module receiving the second image signal and a second touch panel 231, and a second HID module 240 that receives a second touch signal generated by a touch of the second touch panel 231. Here, the first display 112 may display a first image display signal output by a drive of the first display module 130 receiving the first image signal, the second HID module 240 may transmit the second touch signal to the first HID module 150, the first application module 120 is driven by the second touch signal transmitted from the first HID module 150, and the first and second image signals output by the drive of the first application module may be respectively distributed to the first display module 130 and the first image communication module 140. More specifically, when a user having the host mobile terminal 100 touches the first touch panel 111 of the first touch screen unit 110, the first touch panel 111 generates a first touch signal. Such a first touch signal is transmitted to the first application module 120 mounted in the host mobile terminal 100. In this instance, the first application module 120 is driven by the first touch signal, and distributes and outputs a first image signal and a second image signal. Here, the first image signal is output to the first display module 130, and the second image signal is output to the first image communication module 140. More specifically, the first application module 120 outputs each image signal (the first image signal and the second image signal) corresponding to, for example, a display pixel of 1280×1024, and then transmits the first image signal to the first display module 130, and the second image signal to the first image communication module 140. In this instance, the first image signal transmitted to the first display module 130 and the second image signal transmitted to the first image communication module 140 may be image signals outputting the same image, or image signals outputting different images.

Next, the first display module 130 to which the first image signal is transmitted converts the input first image signal to a first image display signal to thereby output the first image display signal, and the output first image display signal is displayed by the first display 112 of the first touch screen unit 110.

In addition, the first image communication module 140 transmits the input second image signal to the second image communication module 210. In this instance, it is preferable that the first image communication module 140 and the second image communication module 210 be any one of a mobile high-definition link (MHL) module, a WiFi module, and a WiHD module. Here, the WiHD module refers to a wireless transmission communication module that transmits images at a rate of 1 Gbps. The second display module 220 converts the input second image signal to a second image display signal to thereby output the second image display signal, and the second display 232 of the second touch screen unit 230 displays the second image display signal.

Meanwhile, when a user that ascertains an image by the second image display signal which is displayed on the second display 232 of the second touch screen unit 230, touches the second touch panel 231 of the second touch screen unit 230, the second touch panel 231 generates a second touch signal, and the second touch signal is transmitted to the second HID module 240. In addition, the second HID module 240 transmits the second touch signal to the first HID module 150 in a Bluetooth manner, and the first HID module transmits the input second touch signal to the first application module 120.

Thereafter, the first application module 120 is driven by the transmitted second touch signal, and new first and second image signals output by the drive of the first application module 120 are respectively distributed to the first display module 130 and the first image communication module 140. In the same manner as above, the first image signal and the second image signal are respectively displayed on the first display 112 and the second display 230 as the same image or different images.

By the above-described configuration, the present invention may acquire the dummy touch screen 200 that can be driven even without an application or a CPU. Accordingly, when there is a host mobile terminal including an application module that requires high functionality and cost, using the dummy touch screen including a touch function and a display function even without the application module, an additional expensive device such as a tablet PC having a function of high performance overlapped with the function of the host mobile terminal, is not required.

In addition, by touching a screen of the host mobile terminal, the dummy touch screen in addition to the host mobile terminal may be manipulated, and in the same manner, by touching the dummy touch screen, the screen of the host mobile terminal in addition to the dummy touch screen may be manipulated. Such bidirectional touch and a bidirectional screen display may be realized by only an application of the host mobile terminal without driving a separate application on the dummy touch screen.

Figure 2:
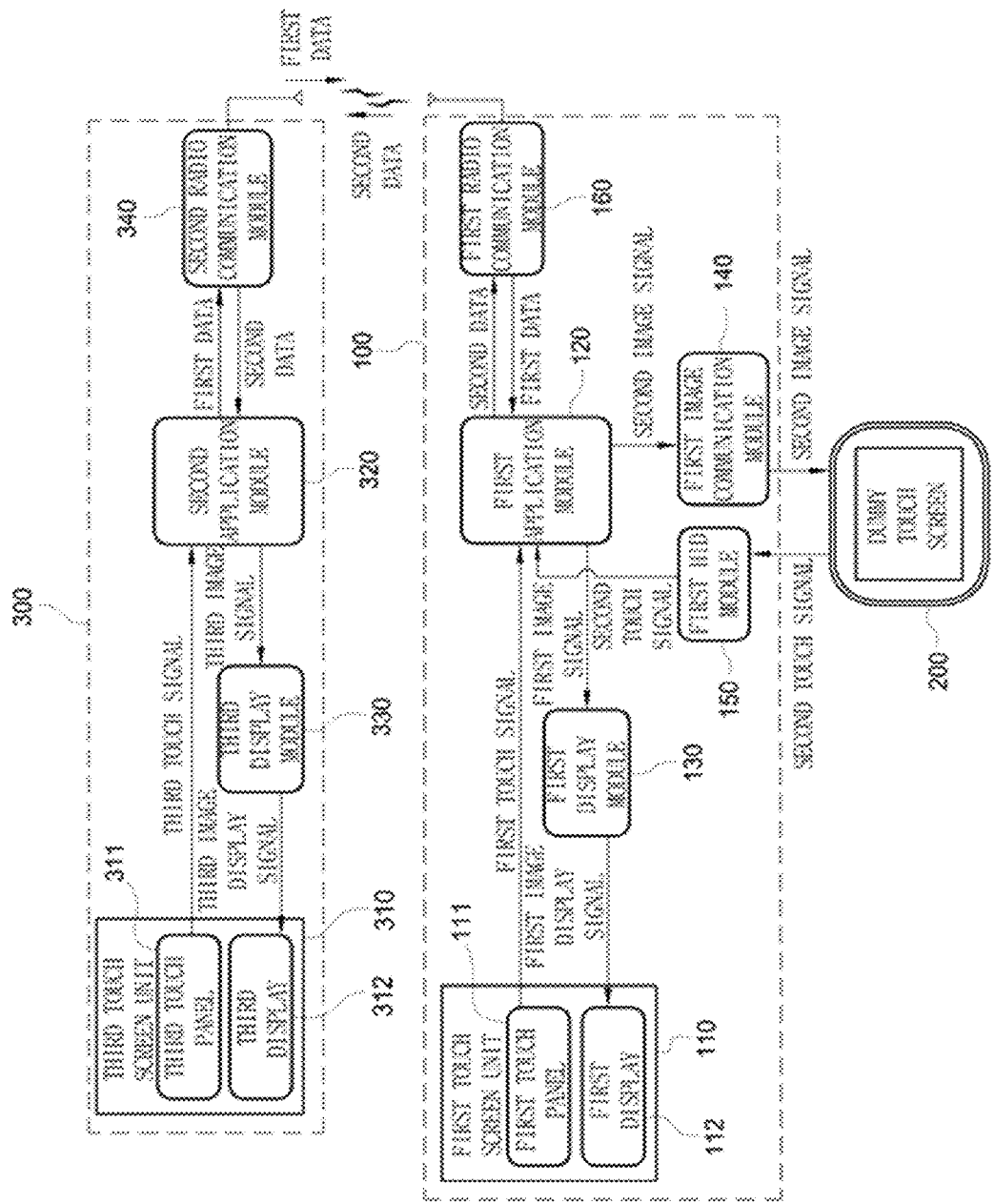
FIG. 2 is a diagram illustrating a configuration of a dummy touch screen system enabling bidirectional mirroring according to an embodiment of the present invention.

Next, FIG. 2 is a diagram illustrating a configuration of a dummy touch screen system enabling bidirectional mirroring according to an embodiment of the present invention.

Referring to FIG. 2, the dummy touch screen system enabling bidirectional mirroring according to an embodiment of the present invention includes the above-described host mobile terminal 100, a dummy touch screen 200 without including an application, and at least one additional mobile terminal 300 including an application.

More specifically, the dummy touch screen system enabling bidirectional mirroring according to an embodiment of the present invention may further include at least one additional mobile terminal 300 that has a second radio communication module 340 so as to perform radio transmission and reception with the host mobile terminal 100, in addition to the host mobile terminal 100 and the dummy touch screen 200, and the host mobile terminal 100 may further include a first radio communication module 160 that performs radio communication with the second radio communication module 340. In addition, the at least one additional mobile terminal 300 may include a third touch screen unit 310 that has a third touch panel 311 and a third display 312, a second application module 320 that is driven by receiving a third touch signal generated by a touch of the third touch panel 311, a third display module 330 that receives a third image signal output by a drive of the second application module 320 receiving the third touch signal, and the second radio communication module 340 that receives first data output by the drive of the second application module 320 receiving the third touch signal. In addition, the third display 312 displays a third image display signal output by a drive of the third display module 330 receiving the third image signal, the second radio communication module 340 transmits the received first data to the first radio communication module 160, and the first radio communication module 160 transmits the received first data to the first application module 120. In addition, the first application module 120 is driven by the first data received from the first radio communication module 160, the first and second image signals and second data output by the drive of the first application module are respectively distributed to the first display module 130, the first image communication module 140, and the first radio communication module 160, and the first radio communication module 160 transmits the second data distributed to the first radio communication module 160 to the second radio communication module 340. In addition, the second radio communication module 340 transmits the received second data to the second application module 320, the third display module 330 receives the third image signal output by the drive of the second application module 320 receiving the second data, and the third display 312 displays the third image display signal output by the drive of the third display module 330 receiving the third image signal.

More specifically, the first HID module 150 of the host mobile terminal 100 and the second HID module 240 of the dummy touch screen 200 are connected with each other in a manner of Bluetooth radio transmission and reception. In addition, the first image communication module 140 of the host mobile terminal 100 and the second image communication module 210 of the dummy touch screen 200 are connected with each other in a wired manner using an MHL port, or connected with each other using a radio transmission and reception method such as zigbee, WiFi, WiHD, or the like.

Next, the at least one additional mobile terminal 300 including the third touch screen unit 310 having the third touch panel 311 and the third display 312, the third display module 330, the second application module 320, and the second radio communication module, is connected to the host mobile terminal 100 using the radio transmission and reception method such as zigbee, WiFi, WiHD, or the like. Such a radio transmission and reception method may be performed by the first radio communication module 160 included in the host mobile terminal 100, and the second radio communication module 340 included in the additional mobile terminal 300. When such a connection is achieved, a user having the at least one additional mobile terminal 300 touches the third touch panel 311 of the third touch screen unit 310 to thereby generate a third touch signal. The generated third touch signal is transmitted to the second application module 320, and the second application module 320 receiving the third touch signal outputs a third image signal and first data by the drive of the second application module 320. In this instance, the third image signal is transmitted to the third display module 330, and is output as a third image display signal by the drive of the third display module 330 to thereby be displayed on the third display 312. Here, the first data is data generated by the drive of the second application module 320, and is data to be transmitted for connection with the host mobile terminal. For example, the first data may be a result value obtained in such a manner that a command is executed between applications, and may be an address indicating a position where the result value is stored. In addition, the first data may be an image signal itself. Here, the third image signal and the first data which are output by the drive of the second application module 320, may be distributed to image signals outputting the same image or image signals outputting different images. Meanwhile, the first data output by the drive of the second application module 320 is transmitted to the second radio communication module 340, and the third radio communication module 340 transmits the received first data to the first radio communication module 160. In this instance, it is preferable that the first data be transmitted in a manner of zigbee, WiFi, or WiHD.

Next, the first radio communication module 160 transmits the received first data to the first application module 120 mounted in the host mobile terminal 100, and the first application module 120 drives the received first data to thereby output the driven first data to a first image signal, a second image signal, and second data. In this instance, as described above, the first image signal is transmitted to the first display module 130, and the first display module 130 displays a first image display signal on the first display 112 by its own drive. Here, it is preferable that the first image signal, the second image signal, and the second data which are output by the drive of the first application module 120 be distributed to image signals outputting the same image, or image signals outputting different images. In addition, the second image signal is transmitted to the first image communication module 140, the first image communication module 140 transmits the received second image signal to the second image communication module 210, the second display module 220 receiving the second image signal outputs a second image display signal by its own drive, and the second image display signal is displayed on the second display 232. Here, it is preferable that the first image communication module 140 and the second image communication module 210 be any one of an MHL module, a WiFi module, and a WiHD module. Meanwhile, the second data distributed by the first application module 120 is transmitted to the first radio communication module 160, and the first radio communication module 160 transmits the second data using a radio communication method such as zigbee, WiFi, WiHD, or the like. The second radio communication module 340 transmits the received second data to the second application module 320, and the second application module 320 converts the received second data to a third image signal to thereby output. The third display module 330 receiving the third image signal outputs a third image display signal by its own drive, and the third image display signal is displayed on the third display 312.

By the above-described configuration, the present invention may respectively display the same image or different images through the first display 112, the second display 232, and the third display 312, and therefore an effect such as bidirectional mirroring may be obtained by the same images or the different images which are displayed on the first display 112, the second display 232, and the third display 312. In addition, by touching a screen of the host mobile terminal, the dummy touch screen and a screen of the additional mobile terminal in addition to the host mobile terminal, may be manipulated, and in the same manner, by touching the screen of the dummy touch screen, the host mobile terminal and the screen of the additional mobile terminal in addition to the dummy touch screen, may be manipulated. Even when touching the screen of the additional mobile terminal, the host mobile terminal and the screen of the dummy touch screen may be manipulated. Accordingly, bidirectional touch and a bidirectional screen display between a plurality of mobile terminals and the dummy touch screen may be realized without driving a separate application in the dummy touch screen.

Figure 3:
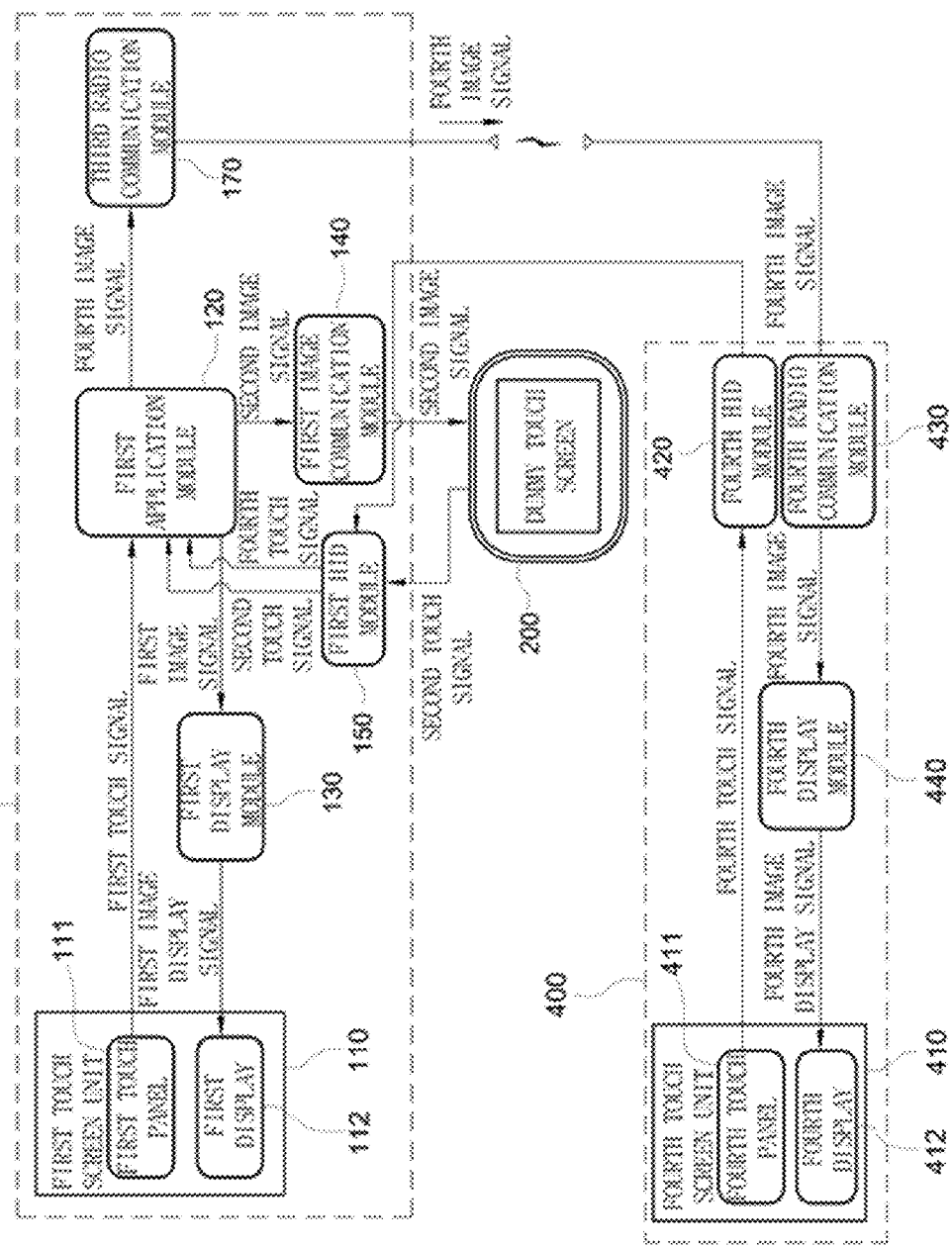
FIG. 3 is a diagram illustrating a configuration of a dummy touch screen system enabling bidirectional mirroring according to another embodiment of the present invention.

FIG. 3 is a diagram illustrating a configuration of a dummy touch screen system enabling bidirectional mirroring according to another embodiment of the present invention.

Referring to FIG. 3, the dummy touch screen system enabling bidirectional mirroring according to another embodiment of the present invention includes the above-described host mobile terminal 100, a dummy touch screen 200 without including an application, and at least one additional mobile terminal 400 without including an application.

More specifically, the dummy touch screen system enabling bidirectional mirroring according to another embodiment of the present invention may further include at least one additional mobile terminal 400 that has a fourth radio communication module 430 so as to perform radio transmission and reception with the host mobile terminal 100, in addition to the host mobile terminal 100 and the dummy touch screen 200. Here, the host mobile terminal 100 may further include a third radio communication module 170 that performs radio communication with the outside. In addition, the at least one additional mobile terminal 400

Includes a fourth radio communication module 430 that receives a fourth image signal from the outside, a fourth touch screen unit 410 that has a fourth touch panel 411 and a fourth display 412, a fourth HID module 420 that receives a fourth touch signal generated by a touch of the fourth touch panel 411 and transmits the fourth touch signal to the first HID module 150, and a fourth display module 440 that receives the fourth image signal from the fourth radio communication module 430. In addition, the first HID module 150 transmits the received fourth touch signal to the first application module 120, the first application module 120 is driven by the fourth touch signal received from the first HID module 150, and the first, the second, and the fourth image signals output by the drive of the first application module are respectively distributed to the first display module 130, the first image communication module 140, and the third radio communication module 170. In addition, the third radio communication module 170 transmits the fourth image signal distributed to the third radio communication module to the fourth radio communication module 430, and the fourth display 412 displays a fourth image display signal output by a drive of the fourth display module 440 receiving the fourth image signal.

More specifically, the first HID module 150 of the host mobile terminal 100 and the second HID module 240 of the dummy touch screen 200 are connected with each other in a manner of Bluetooth radio transmission and reception.

In addition, the first image communication module 140 of the host mobile terminal 100 and the second image communication module 210 of the dummy touch screen 200 are connected with each other in a wired manner using an MHL port, or are connected with each other using a radio transmission and reception method such as zigbee, WiFi, WiHD, or the like.

Next, the at least one additional mobile terminal 400 including the fourth touch screen unit 410 having the fourth touch panel 411 and the fourth display 412, the fourth display module 440, the fourth radio communication module 430, and the fourth HID module 420 is connected to the host mobile terminal 100 using the radio transmission and reception method such as zigbee, WiFi, WiHD, or the like. Such a radio transmission and reception method may be performed by the third radio communication module 170 included in the host mobile terminal 100 and the fourth radio communication module 430 included in the additional mobile terminal 400. When such a connection is achieved, an initial fourth image signal from the host mobile terminal 100 is transmitted to the fourth radio communication module 430 of the at least one additional mobile terminal 400, and the fourth radio communication module 430 transmits the transmitted fourth image signal to the fourth display module 440. The fourth display module 440 converts the fourth image signal to a fourth image display signal by its own drive to thereby display the fourth image display signal on the fourth display 412. Next, a user having the at least one additional mobile terminal 400 ascertains the fourth image display signal displayed on the fourth display 412, and then touches the fourth touch panel 411 of the fourth touch screen unit 410 to thereby generate a fourth touch signal. The generated fourth touch signal is transmitted to the fourth HID module 420, and the fourth HID module 420 receiving the fourth touch signal transmits the fourth touch signal to the first HID module 150 through a Bluetooth radio transmission and reception method. The first HID module 150 receiving the fourth touch signal transmits the fourth touch signal to the first application module 120. The first application module 120 is driven by the received fourth touch signal, and the first application module 120 outputs a first image signal, a second image signal, and a fourth image signal by the drive of the first application module 120. In this instance, the first image signal is transmitted to the first display module 130, and the first image signal is output as a first image display signal by the drive of the first display module 130 to thereby be displayed on the first display 112. Here, it is preferable that the first image signal, the second image signal, and the fourth image signal which are output by the drive of the first application module 120 be distributed to images signals outputting the same image, or image signals outputting different images.

In addition, the second image signal is transmitted to the first image communication module 140, the first image communication module 140 transmits the received second image signal to the second image communication module 210, and the second display module 220 receiving the second image signal outputs a second image display signal by its own drive and displays the second image display signal on the second display 232. Here, it is preferable that the first image communication module 140 and the second image communication module 210 be any one of an MHL module, a WiFi module, and a WiHD module.

Meanwhile, the fourth image signal output by the drive of the first application module 120 is transmitted to the third radio communication module 170, and the third radio communication module 170 transmits the received fourth image signal to the fourth radio communication module 430. In this instance, it is preferable that the fourth image signal be transmitted using a radio communication method such as zigbee, WiFi, WiHD, or the like.

Next, the fourth radio communication module 430 transmits the received fourth image signal to the fourth display module 440, and the fourth display module 440 converts the fourth image signal received by its own drive to a fourth image display signal to thereby display the fourth image display signal on the fourth display 412.

By the above-described configuration, the present invention may respectively display the same image or different images through the first display 112, the second display 232, and the fourth display 412, and therefore an effect such as bidirectional mirroring may be obtained by the same images or the different images which are displayed on the first display 112, the second display 232, and the fourth display 412. In addition, by touching the screen of the host mobile terminal, the dummy touch screen and the screen of the additional mobile terminal in addition to the host mobile terminal, may be manipulated, and in the same manner, by touching the screen of the dummy touch screen, the host mobile terminal and the screen of the additional mobile terminal in addition to the dummy touch screen, may be manipulated. In case of touching the screen of the additional mobile terminal, the host mobile terminal and the screen of the dummy touch screen may be manipulated. Accordingly, bidirectional touch and a bidirectional screen display between a plurality of mobile terminals and the dummy touch screen may be realized without driving a separate application in the dummy touch screen.

In addition, according to an embodiment of the present invention, an "application (app)" may be used through a Local Area Network (LAN, for example, Bluetooth or the like) even in the dummy touch screen 200 and the additional mobile terminal 400 which do not have the "application (app)" even though the "application (app)" is included only in the host mobile terminal 100.

Figure 4:
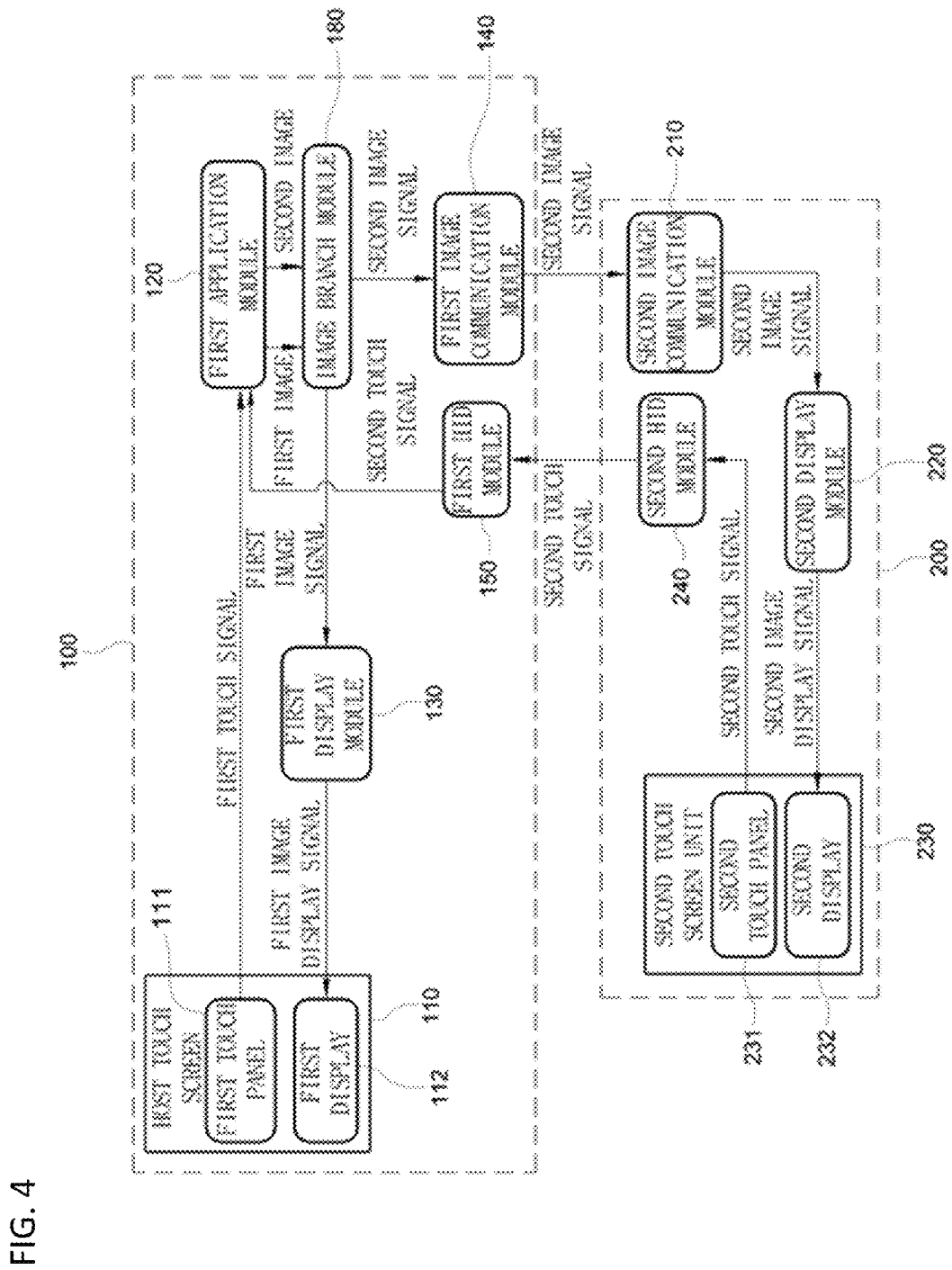
FIG. 4 is a diagram illustrating a configuration in which an image branch module is added in a dummy touch screen system enabling bidirectional mirroring according to an embodiment of the present invention.

FIG. 4 is a diagram illustrating a configuration in which an image branch module is added in a dummy touch screen system enabling bidirectional mirroring according to an embodiment of the present invention.

Referring to FIG. 4, the dummy touch screen system enabling bidirectional mirroring according to an embodiment of the present invention has the same configuration between the host mobile terminal and the dummy touch screen which are shown in FIG. 1, except that an image branch module is added.

In FIG. 4, the dummy touch screen system may further include an image branch module 180 that respectively distributes a first image and a second image output with a time difference by the drive of the first application module 120 receiving the first touch signal. The first display module 130 may receive the first image signal from the image branch module 180, and the first image communication module 140 may receive the second image signal from the image branch module 180.

More specifically, when a user having the above-described host mobile terminal 100 touches the first touch panel 111 of the first touch screen unit 110, the first touch panel 111 generates a first touch signal. Such a first touch signal is transmitted to the first application module 120 mounted in the host mobile terminal 100. In this instance, the first application module 120 is driven by the first touch signal, and distributes the first image and the second image to thereby output. Here, the distributed first and second images are transmitted to the image branch module 180, and the image branch module 180 outputs the transmitted first image as a first image signal to thereby be transmitted to the first display module 130. Meanwhile, it is preferable that the image signal output by the drive of the first application module 120 be distributed to image signals outputting the same image and image signals outputting different images. In addition, the image branch module 180 outputs the transmitted second image as a second image signal to thereby be transmitted to the first image communication module 140. Here, it is preferable that the first image signal and the second image signal be distributed by a latch circuit or the like.

More specifically, the first application module 120 may generate image signals corresponding to a display pixel of 1280×1024 with a time difference. That is, the first application module 120 outputs the first image signal, and outputs the second image signal with a slight time difference, and thereby alternately transmit the first image signal and the second image signal to the image branch module 180. Obviously, the first image signal and the second image signal which are generated with a time difference may be image signals outputting the same image, and image signals outputting different images.

Next, the first display module 130 to which the first image signal is transmitted converts the input first image signal to a first image display signal to thereby output, and the output first image display signal is displayed by the first display 112 of the first touch screen unit 110. In addition, the first image communication module 140 transmits the input second image signal to the second image communication module 210. Here, it is preferable that the first image communication module 140 and the second image communication module 210 be any one of an MHL module, a WiFi module, and a WiHD module. The second display module 220 converts the input second image signal to a second image display signal to thereby be output, and the second display 232 of the second touch screen unit 230 displays the second image display signal.

Meanwhile, when a user that ascertains an image by the second image display signal displayed on the second display 232 of the second touch screen unit 230, touches the second touch panel 231 of the second touch screen unit 230, the second touch panel 231 generates a second touch signal, and the second touch signal is transmitted to the second HID module 240. In addition, the second HID module 240 transmits the second touch signal to the first HID module 150 through a Bluetooth radio transmission and reception method, and the first HID module transmits the input second touch signal to the first application module 120.

Thereafter, the first application module 120 is driven by the received second touch signal, and new first and second image signals output by the drive of the first application module 120 are respectively distributed to the first display module 130 and the first image communication module 140, and the first and second image signals are respectively displayed on the first display 112 and the second display 232 as the same image or different images.

Figure 5A:
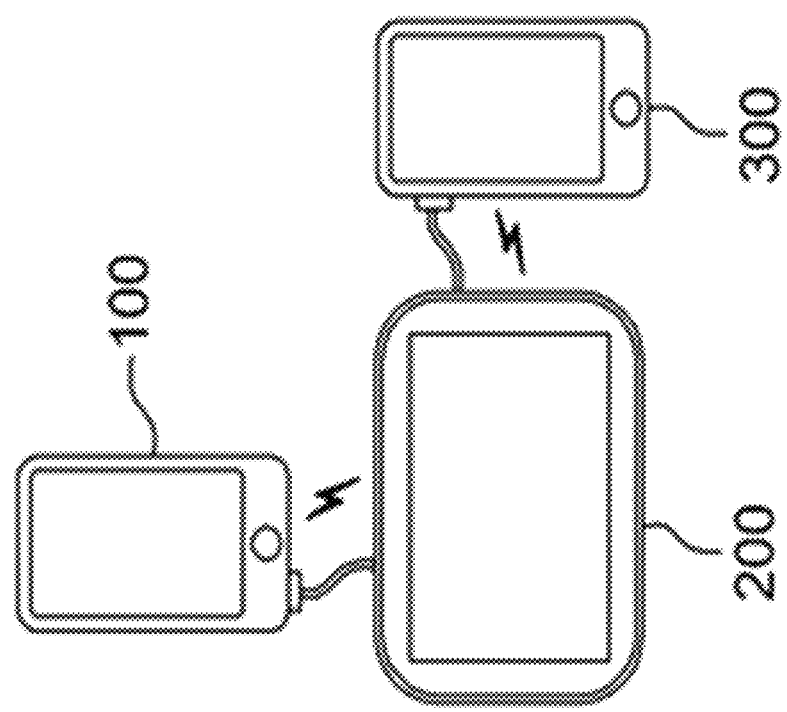
FIGS. 5A to 5C are plan views illustrating a variety of configurations of a dummy touch screen system enabling bidirectional mirroring according to an embodiment of the present invention.
Figure 5B:
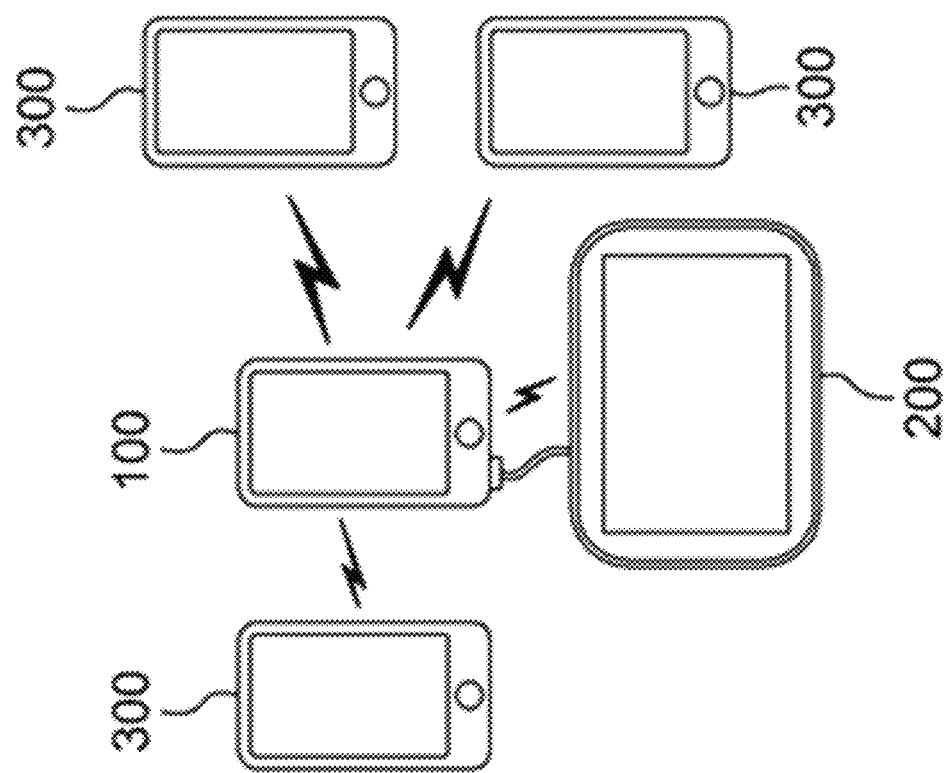
Figure 5C:
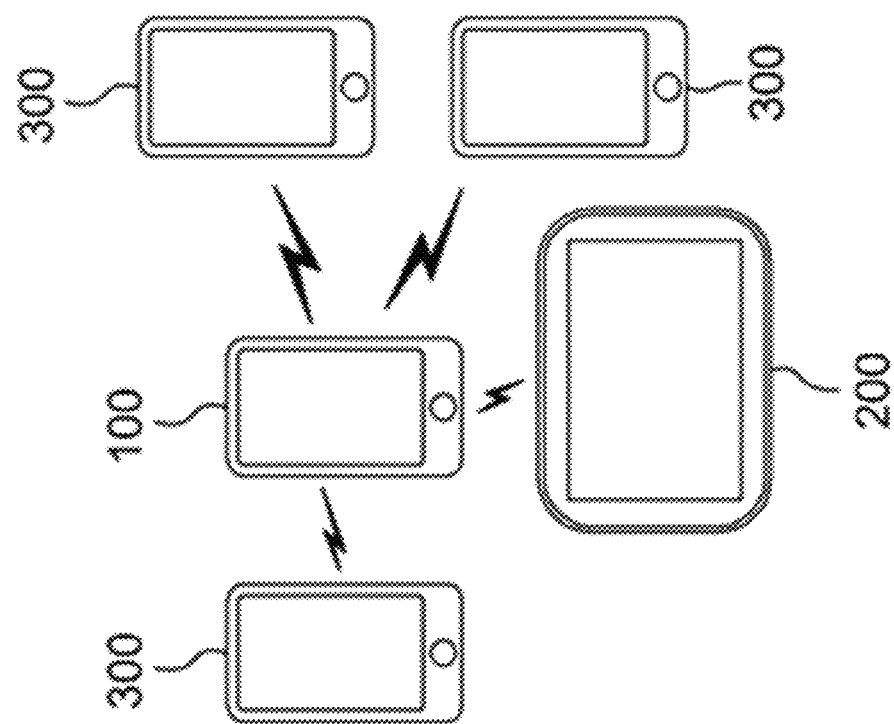

FIGS. 5A to 5C are plan views illustrating a variety of configurations of a dummy touch screen system enabling bidirectional mirroring according to an embodiment of the present invention.

Referring to FIG. 5A, in the dummy touch screen system enabling bidirectional mirroring according to an embodiment of the present invention, the dummy touch screen 200 may further include at least one image communication module, and at least one additional mobile terminal 300 having the same configuration as that of the host mobile terminal 100 is connected to the at least one image communication module. Obviously, it is preferable that a touch signal between the host mobile terminal 100 and the dummy touch screen 200, or a touch signal between the additional mobile terminal 300 and the dummy touch screen 200 be transmitted and received using a Bluetooth radio transmission and reception method.

In addition, referring to FIG. 5B, in the dummy touch screen system enabling bidirectional mirroring according to an embodiment of the present invention, the dummy touch screen 200 and the host mobile terminal 100 are connected with each other through the at least one image communication module, and it is preferable that the touch signal between the dummy touch screen 200 and the host mobile terminal 100 be transmitted and received using the Bluetooth radio transmission and reception method. Meanwhile, the at least one additional mobile terminal 300 is connected with the host mobile terminal 100 using a radio communication method, and it is preferable that the radio communication method be any one of zigbee, a WiFi module, and a WiHD module.

In addition, referring to FIG. 5C, in the dummy touch screen system enabling bidirectional mirroring according to an embodiment of the present invention, the dummy touch screen 200 and the host mobile terminal 100 are connected with each other using a radio communication method, and it is preferable that the radio communication method be any one of zigbee, a WiFi module, and a WiHD module. Such a radio communication method may transmit and receive the touch signals and the image signals in a wireless manner. Meanwhile, the at least one additional mobile terminal 300 is connected to the host mobile terminal 100 using a radio communication method, and it is preferable that the radio communication method be any one of zigbee, a WiFi module, and a WiHD module.

Such a dummy touch screen system may be used in the following method.

For example, in a meeting using a plurality of mobile terminals and the dummy touch screen, materials under consideration at the meeting may be displayed on the dummy touch screen, and each mobile terminal may examine its own materials. Next, each mobile terminal may display the materials on the dummy touch screen by a gesture of touching and drawing its own materials. Next, the materials displayed on the dummy touch screen may be transmitted to each mobile terminal by a touch gesture of drawing the materials to each mobile terminal, and be displayed.

In addition, for example, in a multi-player game such as a board game, a board in which a game is played on may be displayed on the dummy touch screen, and each game card, items, and the like, may be displayed on each mobile terminal. Here, a corresponding game is played by touching an item such as an object, a die, or the like, being played on the dummy touch screen, or the corresponding game may be transmitted to each mobile terminal by touching a game card. By touching the game card of its own mobile terminal by a user, each mobile terminal may transmit the corresponding game to a mobile terminal of another user or the dummy touch screen. Beyond this, the dummy touch screen system according to an embodiment of the present invention may be applied to a game such as a card game in which several people play around a common table. In addition, even in a racing game or the like, the dummy touch screen system according to an embodiment of the present invention may be applied in such a manner that tracks may be displayed on the dummy touch screen, and a screen in which its own vehicle is driven by a user may be displayed on each mobile terminal.

By the above-described configuration, the present invention may have an effect of avoiding redundancy of high functionality of a device (for example, a laptop, tablet PC, TV, or the like) other than the host mobile terminal (for example, a smart phone).

In addition, according to an embodiment of the present invention, a storage medium of a variety of information (for example, an address book, call history, work files, photos, etc.) is unified into a smart phone, and therefore efficient management of the variety of information may be performed.

In addition, according to an embodiment of the present invention, in a case of a meeting using a plurality of mobile terminals (for example, a smart phone, or the like), a desired screen (a screen of a selected mobile terminal) may be delivered using selective ON/OFF.

In addition, bidirectional transmission of touch data is made possible, and therefore image (photos) drawing and widget movement from the dummy touch screen to a smart phone may be made possible.

According to an embodiment of the present invention, there is provided a dummy touch screen system enabling bidirectional mirroring that may transmit a variety of data displayed on a screen of a smart phone to video equipment such as a dummy touch screen or the like, and transmit a variety of data displayed on the video equipment such as the dummy touch screen or the like, to the smart phone.

In addition, according to an embodiment of the present invention, there is provided a dummy touch screen system that may perform input and output of a variety of data (image data or touch data) by implementing bidirectional mirroring.

While the example embodiments of the present invention and their advantages have been described in detail, it should be understood that various changes, substitutions and alterations may be made herein without departing from the scope of the invention.

What is claimed is:

1. A dummy touch screen system comprising:
   a host mobile terminal including
   a first touch screen unit that has a first touch panel and a first display,
   a first application module that is driven by receiving a first touch signal generated by a touch of the first touch panel,
   a first display module that receives a first image signal output by a drive of the first application module receiving the first touch signal,
   a first image communication module that receives a second image signal output by the drive of the first application module receiving the first touch signal, and
   a first human interface device (HID) module that transmits a touch signal transmitted from the outside to the first application module; and
   a dummy touch screen including
   a second image communication module that receives the second image signal,
   a second display module that receives the second image signal from the second image communication module,
   a second touch screen unit that has a second display that displays a second image display signal output by a drive of the second display module receiving the second image signal and a second touch panel, and
   a second HID module that receives a second touch signal generated by a touch of the second touch panel,
   wherein the first display displays a first image display signal output by a drive of the first display module receiving the first image signal, the second HID module transmits the second touch signal to the first HID module, the first application module is driven by the second touch signal transmitted from the first HID module, and the first and second image signals output by the drive of the first application module are distributed to the first display module and the first image communication module, respectively, the dummy touch screen system further comprising:

an image branch module that respectively distributes a first image and a second image output with a time difference by the drive of the first application module receiving the first touch signal, wherein the first display module receives the first image signal from the image branch module, and the first image communication module receives the second image signal from the image branch module.

2. The dummy touch screen system of claim 1, further comprising:

at least one additional mobile terminal that has a second radio communication module so as to perform radio transmission and reception with the host mobile terminal, wherein the host mobile terminal further includes a first radio communication module that performs radio communication with the second radio communication module, the at least one additional mobile terminal includes a third touch screen unit that has a third touch panel and a third display, a second application module that is driven by receiving a third touch signal generated by a touch of the third touch panel, a third display module that receives a third image signal output by a drive of the second application module receiving the third touch signal, and the second radio communication module that receives first data output by the drive of the second application module receiving the third touch signal, the third display displays a third image display signal output by a drive of the third display module receiving the third image signal, the second radio communication module transmits the received first data to the first radio communication module, and the first radio communication module transmits the received first data to the first application module, the first application module is driven by the first data received from the first radio communication module, the first and second image signals and second data output by the drive of the first application module are respectively distributed to the first display module, the first image communication module, and the first radio communication module, the first radio communication module transmits the second data distributed to the first radio communication module to the second radio communication module, the second radio communication module transmits the received second data to the second application module, the third display module receives the third image signal output by the drive of the second application module receiving the second data, and the third display displays the third image display signal output by the drive of the third display module receiving the third image signal.

3. The dummy touch screen system of claim 1, further comprising:

at least one additional mobile terminal that has a fourth radio communication module so as to perform radio transmission and reception with the host mobile terminal, wherein the host mobile terminal further includes a third radio communication module that performs radio communication with the outside, the at least one additional mobile terminal includes a fourth radio communication module that receives a fourth image signal from the outside, a fourth touch screen unit that has a fourth touch panel and a fourth display, a fourth HID module that receives a fourth touch signal generated by a touch of the fourth touch panel and transmits the fourth touch signal to the first HID module, and a fourth display module that receives the fourth image signal from the fourth radio communication module, the first HID module transmits the received fourth touch signal to the first application module, the first application module is driven by the fourth touch signal received from the first HID module, the first, the second, and the fourth image signals output by the drive of the first application module are respectively distributed to the first display module, the first image communication module, and the third radio communication module, the third radio communication module transmits the fourth image signal distributed to the third radio communication module to the fourth radio communication module, and the fourth display displays a fourth image display signal output by a drive of the fourth display module receiving the fourth image signal.

4. The dummy touch screen system of claim 1, wherein the second touch signal transmitted from the second HID module to the first HID module is transmitted in a manner of Bluetooth radio transmission and reception.

5. The dummy touch screen system of claim 3, wherein the fourth touch signal transmitted from the fourth HID module to the first HID module is transmitted in a manner of Bluetooth radio transmission and reception.

6. The dummy touch screen system of claim 1, wherein the dummy touch screen further includes at least one image communication module, and at least one additional mobile terminal having the same configuration as that of the host mobile terminal is connected to the at least one image communication module.

7. The dummy touch screen system of claim 1, wherein the first image communication module and the second image communication module are any one of an MHL module, zigbee, a WiFi module, and a WiHD module.

8. The dummy touch screen system of claim 1, wherein the first and second image signals output by the drive of the first application module are distributed to an image signal outputting the same image, or an image signal outputting different images.

* * * * *